(12) United States Patent
Galliano, III et al.

(10) Patent No.: US 12,091,039 B2
(45) Date of Patent: *Sep. 17, 2024

(54) AUGMENTED REALITY NOTIFICATION SYSTEM

(71) Applicant: GM Cruise Holdings LLC, San Francisco, CA (US)

(72) Inventors: Anthony Galliano, III, Seattle, WA (US); Arun A. Mathews, New Castle, WA (US); Charlotte Blanc, San Francisco, CA (US); Pratik Palnitkar, Kirkland, WA (US); John Logan Anderson, San Francisco, CA (US); Jacqueline Mary Shannon, Corte Madera, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,693

(22) Filed: Aug. 17, 2023

(65) Prior Publication Data

US 2023/0391353 A1   Dec. 7, 2023

Related U.S. Application Data

(63) Continuation of application No. 16/731,877, filed on Dec. 31, 2019, now Pat. No. 11,760,370.

(51) Int. Cl.
*B60W 50/14* (2020.01)
*B60W 60/00* (2020.01)
(Continued)

(52) U.S. Cl.
CPC ...... *B60W 50/14* (2013.01); *B60W 60/00253* (2020.02); *G02B 27/0101* (2013.01);
(Continued)

(58) Field of Classification Search
None
See application file for complete search history.

(56) References Cited

U.S. PATENT DOCUMENTS 5,510,983 A * 4/1996 Iino ............................ G01P 1/08
701/1
8,346,426 B1 * 1/2013 Szybalski ............. B60W 50/14
701/28
(Continued)

FOREIGN PATENT DOCUMENTS

CN    106240481 A  * 12/2016  ............. B60R 11/02
CN    106240481 B  * 11/2018  ............. B60R 11/02
(Continued)

*Primary Examiner* — Kevin R Steckbauer

(57) ABSTRACT

The present disclosure provides a method comprising detecting an event in connection with an autonomous vehicle, wherein the detected event comprises at least one of a current state of the autonomous vehicle, an impending state of the autonomous vehicle, and an intent of the autonomous vehicle; generating an image in connection with the detected event, wherein the image comprises at least one of text information and graphics information; and displaying the generated image on at least one window of the autonomous vehicle for conveying information about the detected event to at least one user located outside the autonomous vehicle.

19 Claims, 8 Drawing Sheets

(51) Int. Cl.
*G02B 27/01* (2006.01)
*G06T 19/00* (2011.01)

(52) U.S. Cl.
CPC ..... *G06T 19/006* (2013.01); *B60W 2050/146* (2013.01); *G02B 2027/0141* (2013.01); *G02B 2027/0196* (2013.01)

(56) References Cited

U.S. PATENT DOCUMENTS

| | | | |
|---|---|---|---|
| 10,106,084 B2 * | 10/2018 | Lv | H04N 23/698 |
| 10,249,184 B2 * | 4/2019 | Demisse | G08G 1/005 |
| 10,279,683 B2 * | 5/2019 | Torii | G08G 1/0962 |
| 10,311,735 B2 * | 6/2019 | Sato | G02B 27/0101 |
| 10,323,952 B2 * | 6/2019 | Li | G06V 20/56 |
| 10,332,292 B1 * | 6/2019 | Arnicar | G06F 3/011 |
| 10,336,188 B2 * | 7/2019 | Torii | G06V 20/597 |
| 10,401,852 B2 * | 9/2019 | Levinson | G08G 1/202 |
| 10,507,767 B2 * | 12/2019 | Lv | G06V 20/40 |
| 10,571,690 B2 * | 2/2020 | Ellis | G02B 6/006 |
| 10,591,723 B2 * | 3/2020 | Nahman | H04N 23/698 (?) |
| 10,663,963 B2 * | 5/2020 | Tuukkanen | A61B 5/1116 |
| 10,744,933 B2 * | 8/2020 | Sasaki | B60Q 1/507 |
| 10,882,537 B2 * | 1/2021 | Engle | B60K 35/00 |
| 10,982,487 B2 * | 4/2021 | Ramirez | E06B 9/24 |
| 11,148,671 B2 * | 10/2021 | Welch | B60K 35/22 |
| 11,216,755 B2 * | 1/2022 | Leary | B60N 2/0026 |
| 11,221,627 B2 * | 1/2022 | Diehl | B60W 60/00253 |
| 11,267,397 B2 * | 3/2022 | Mimura | B60Q 1/543 |
| 11,312,293 B2 * | 4/2022 | Sadok | G02B 27/0101 |
| 11,314,389 B2 * | 4/2022 | You | G06F 3/04817 |
| 11,321,923 B2 * | 5/2022 | Rober | B60W 50/08 |
| 11,322,114 B2 * | 5/2022 | Bohnert | G09F 21/048 |
| 11,353,871 B2 * | 6/2022 | Xiao | B60W 30/18 |
| 11,407,359 B2 * | 8/2022 | Kumar | G06F 3/013 |
| 11,562,688 B2 * | 1/2023 | Helot | B60K 35/60 |
| 11,571,969 B2 * | 2/2023 | Domeyer | B60Q 1/543 |
| 11,688,184 B2 * | 6/2023 | Austin | B60Q 1/5035 701/23 |
| 11,760,370 B2 * | 9/2023 | Galliano, III | G02B 27/0101 701/23 |
| 11,900,835 B2 * | 2/2024 | Takeda | B60Q 1/543 |
| 2007/0153236 A1 * | 7/2007 | Quach | G03B 21/604 353/20 |
| 2015/0232030 A1 * | 8/2015 | Bongwald | G02B 27/0101 348/115 |
| 2016/0189098 A1 * | 6/2016 | Beaurepaire | H04W 12/084 705/337 |
| 2017/0050564 A1 * | 2/2017 | Lv | H04N 7/181 |
| 2017/0213165 A1 * | 7/2017 | Stauffer | G06Q 10/02 |
| 2017/0300053 A1 * | 10/2017 | Wengreen | B60Q 5/00 |
| 2018/0011313 A1 * | 1/2018 | Nahman | B60K 35/60 |
| 2018/0136651 A1 * | 5/2018 | Levinson | G05D 1/0027 |
| 2018/0190110 A1 * | 7/2018 | Demisse | G06Q 50/40 |
| 2018/0211414 A1 * | 7/2018 | Cronin | G06T 11/00 |
| 2018/0264945 A1 * | 9/2018 | Torii | G08G 1/166 |
| 2018/0268701 A1 * | 9/2018 | Sato | G02B 27/0101 |
| 2019/0016263 A1 * | 1/2019 | Lv | H04N 23/55 |
| 2019/0171008 A1 * | 6/2019 | Koren | G02F 1/0126 |
| 2019/0172411 A1 * | 6/2019 | Murray | B60K 35/00 |
| 2019/0196679 A1 * | 6/2019 | You | G06F 3/0484 |
| 2019/0197927 A1 * | 6/2019 | Matsuoka | G09F 15/0056 |
| 2019/0217773 A1 * | 7/2019 | Sasaki | G09F 21/048 |
| 2020/0004014 A1 * | 1/2020 | Ellis | G02B 27/0101 |
| 2020/0033858 A1 * | 1/2020 | Xiao | B60W 10/18 |
| 2020/0036948 A1 * | 1/2020 | Song | B60W 10/04 |
| 2020/0041997 A1 * | 2/2020 | Tuukkanen | A61B 5/024 |
| 2020/0086888 A1 * | 3/2020 | Engle | B60K 35/00 |
| 2020/0223191 A1 * | 7/2020 | Ladewski | G09F 19/18 |
| 2020/0223352 A1 * | 7/2020 | Toshio Kimura | B60Q 1/547 |
| 2020/0247327 A1 * | 8/2020 | Ito | B60K 35/28 |
| 2020/0285240 A1 * | 9/2020 | Diehl | B60W 60/00253 |
| 2020/0402105 A1 * | 12/2020 | Manicka | H04W 4/02 |
| 2020/0402106 A1 * | 12/2020 | Manicka | H04W 4/23 |
| 2020/0404465 A1 * | 12/2020 | Manicka | G06Q 30/0265 |
| 2020/0410406 A1 * | 12/2020 | Leary | G05D 1/249 |
| 2021/0054690 A1 * | 2/2021 | Ramirez | B60K 35/00 |
| 2021/0054691 A1 * | 2/2021 | Ramirez | B60K 35/50 |
| 2021/0070307 A1 * | 3/2021 | Welch | G02B 27/0172 |
| 2021/0122389 A1 * | 4/2021 | Engle | B60W 30/18 |
| 2021/0171060 A1 * | 6/2021 | Mimura | B60Q 1/549 |
| 2021/0190523 A1 * | 6/2021 | Stumpf | G06V 20/56 |
| 2021/0197847 A1 * | 7/2021 | Galliano, III | B60W 60/00253 |
| 2021/0200811 A1 * | 7/2021 | Krishnamurthi | H04N 7/157 |
| 2021/0300423 A1 * | 9/2021 | Ahire | B60W 50/14 |
| 2021/0304595 A1 * | 9/2021 | Ahire | H04L 9/3247 |
| 2021/0304617 A1 * | 9/2021 | Ahire | G06V 40/20 |
| 2021/0306823 A1 * | 9/2021 | Ahire | H04W 4/023 |
| 2021/0362598 A1 * | 11/2021 | Oh | B60W 60/001 |
| 2021/0379992 A1 * | 12/2021 | Domeyer | B60Q 1/20 |
| 2021/0392290 A1 * | 12/2021 | McNelley | H04N 9/3141 |
| 2021/0394793 A1 * | 12/2021 | Austin | G08G 1/0112 |
| 2022/0001877 A1 * | 1/2022 | Welch | B60K 35/00 |
| 2022/0013045 A1 * | 1/2022 | Takeda | B60K 35/81 |
| 2022/0068199 A1 * | 3/2022 | Helot | B60K 35/60 |
| 2022/0128999 A1 * | 4/2022 | Diehl | G06Q 50/40 |
| 2022/0219538 A1 * | 7/2022 | Hirata | B60K 35/00 |
| 2023/0271590 A1 * | 8/2023 | Moltmann | B60R 25/241 701/24 |
| 2023/0391353 A1 * | 12/2023 | Galliano, III | G02B 27/0101 |

FOREIGN PATENT DOCUMENTS

| | | | | |
|---|---|---|---|---|
| CN | 113226826 | A * | 8/2021 | B60K 35/00 |
| EP | 3057149 | A1 * | 8/2016 | H01L 51/003 |
| EP | 3502862 | A1 * | 6/2019 | B60K 35/00 |
| EP | 3670228 | A1 * | 6/2020 | B60K 35/00 |
| EP | 3670228 | B1 * | 4/2022 | B60K 35/00 |
| EP | 4235615 | A1 * | 8/2023 | B60R 25/241 |
| FR | 3002677 | A1 * | 8/2014 | G06F 27/007 |
| JP | 2017076432 | A * | 4/2017 | |
| JP | 2018198071 | A * | 12/2018 | |
| JP | 6568603 | B2 * | 8/2019 | B60R 1/00 |
| JP | 6655036 | B2 * | 2/2020 | B60K 35/00 |
| JP | 6867913 | B2 * | 5/2021 | |
| JP | 2021117318 | A * | 8/2021 | B60R 1/00 |
| WO | WO-2007020840 | A1 * | 2/2007 | B60K 35/00 |
| WO | WO-2020126329 | A1 * | 6/2020 | B60K 35/00 |
| WO | WO-2020166749 | A1 * | 8/2020 | B60K 35/00 |

* cited by examiner

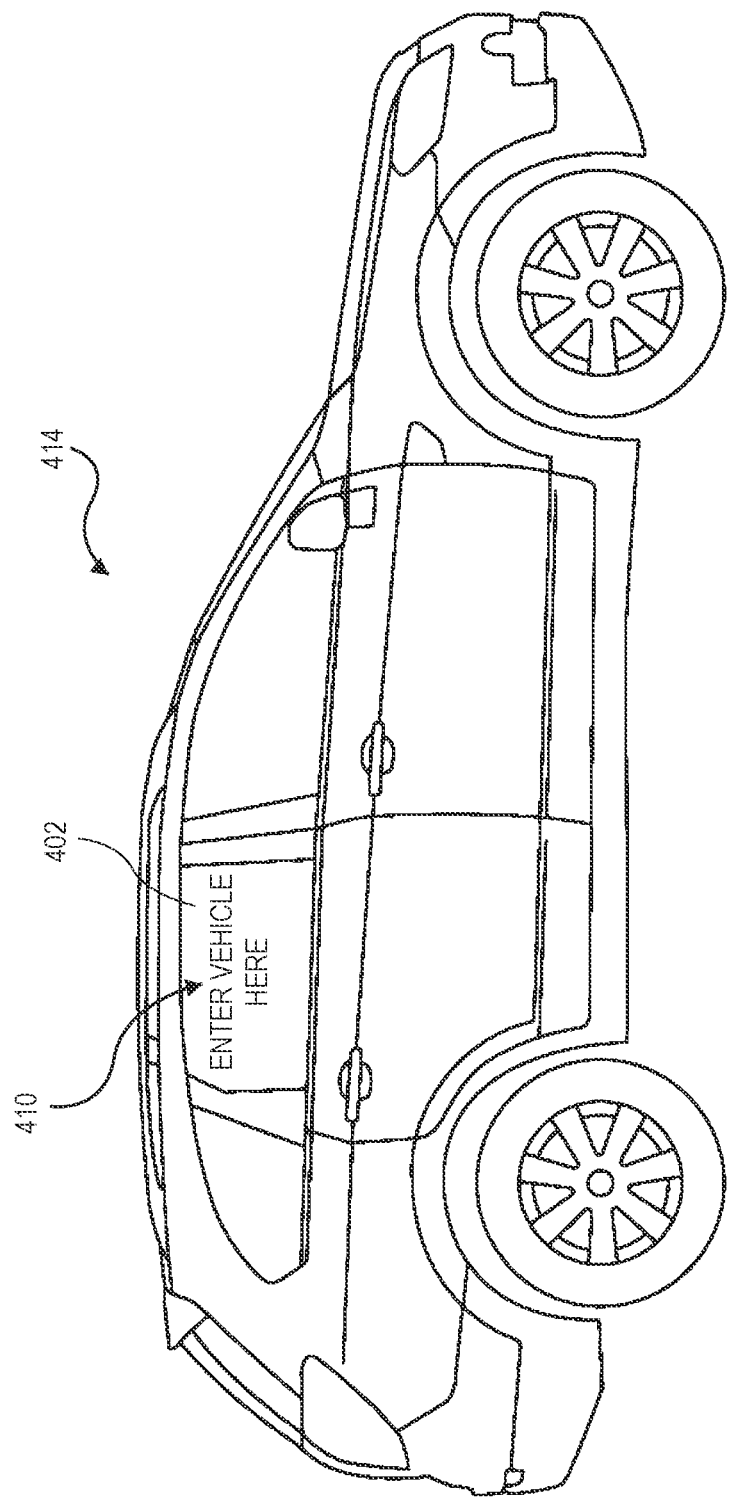

AUGMENTED REALITY NOTIFICATION SYSTEM

CROSS-REFERENCE TO RELATED APPLICATION(S)

This application claims the benefit of and hereby incorporates by reference, for all purposes, the entirety of the contents of U.S. Nonprovisional application Ser. No. 16/731,877, filed Dec. 31, 2019, and entitled, "AUGMENTED REALITY NOTIFICATION SYSTEM".

TECHNICAL FIELD OF THE DISCLOSURE

The present disclosure relates generally to autonomous vehicles (AVs) and, more specifically, to devices and methods for augmented reality for AVs in which messages and/or other information is displayed on a window of the AV.

BACKGROUND

In addition to piloting a vehicle, a human driver may provide other services in connection with delivery of an item from an origin to a destination, including, but not limited to, verbally or otherwise communicating to a recipient information concerning the delivery (e.g., where in the vehicle the item is located). Additionally, a human driver may verbally communicate with an incoming or current passenger regarding which door to use to enter the vehicle or points of interest along a route to the passenger's destination. Autonomous vehicles (AVs) by definition lack a human driver; therefore, other means of communicating with end users, including passengers and others, must be employed.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 4A-4F illustrate a number of example use cases for the augmented reality notification system for an autonomous vehicle according to some embodiments of the present disclosure.

DESCRIPTION OF EXAMPLE EMBODIMENTS OF THE DISCLOSURE

Figure 1:
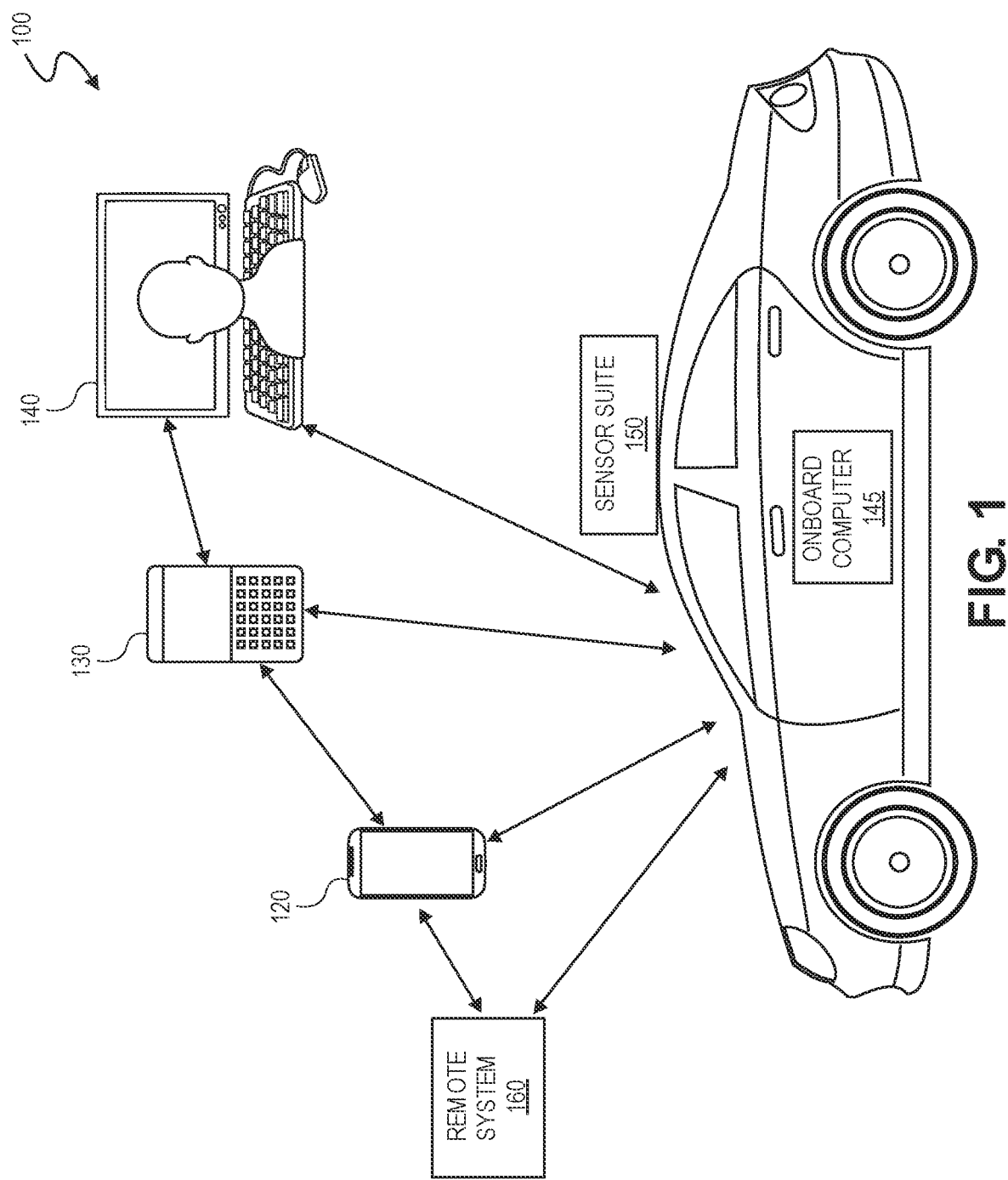
FIG. 1 is a block diagram illustrating an example autonomous vehicle in which an augmented reality notification system according to some embodiments of the present disclosure may be implemented.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Embodiments of the present disclosure provide a method comprising detecting an event in connection with an autonomous vehicle, wherein the detected event comprises at least one of a current state of the autonomous vehicle, an impending state of the autonomous vehicle, and an intent of the autonomous vehicle; generating an image in connection with the detected event, wherein the image comprises at least one of text information and graphics information; and displaying the generated image on at least one window of the autonomous vehicle for conveying information about the detected event to at least one user located outside the autonomous vehicle.

Embodiments of the present disclosure further provide an augmented reality notification system for a vehicle comprising a display control system for detecting an event in connection with the vehicle, the detected event comprising at least one of a current state of the autonomous vehicle, an impending state of the autonomous vehicle, and an intent of the autonomous vehicle; and generating an image in connection with the detected event, wherein the image comprises at least one of text information and graphics information. The system further comprises a display system for displaying the generated image on at least one window of the autonomous vehicle for conveying information about the detected event to at least one user located outside the autonomous vehicle.

Embodiments of the present disclosure still further provide a vehicle comprising an onboard computer, a sensor suite comprising a plurality of imaging devices and at least one sensing device for generating data regarding a perceived environment of the vehicle, and a display control system for detecting an event in connection with the vehicle, the detected event comprising at least one of a current state of the autonomous vehicle, an impending state of the autonomous vehicle, and an intent of the autonomous vehicle, and generating an image in connection with the detected event and the perceived environment, wherein the image comprises at least one of text information and graphics information. The vehicle further includes a display system for displaying the generated image on at least one window of the autonomous vehicle for conveying information about the detected event to at least one user located outside the autonomous vehicle.

Embodiments disclosed herein may be particularly advantageous for communicating to an end user various information and/or messages through use of augmented reality techniques in which such information and/or messages are displayed on a window or other glass surface of a vehicle, which in certain embodiments comprises an autonomous vehicle.

As will be appreciated by one skilled in the art, aspects of the present disclosure, in particular aspects of an intelligent delivery system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

One embodiment is an augmented reality information system for an autonomous vehicle in which messages or other information directed at end users (passengers, delivery recipients, other drivers, and/or bystanders, for example) are displayed on a window of the autonomous vehicle in view of the end user.

As shown in FIG. 1, an augmented reality information system 100 embodying features described herein includes an autonomous vehicle 110 including a passenger interface 120, a vehicle coordinator 130, and/or a remote expert interface 140. In certain embodiments, the remote expert interface 140 allows a non-passenger entity to set and/or modify the behavior settings of the autonomous vehicle 110. The non-passenger entity may be different from the vehicle coordinator 130, which may be a server.

A remote control facility 160, which may comprise a central office or backoffice facility, may also be provided for providing the autonomous vehicle 110 (and particularly, the onboard computer 145) with a number of different system backend functions. The remote control facility 160 may include one or more switches, servers, databases, live advisors, and/or an automated voice response system ("VRS"). Remote control facility 160 may include any or all of the aforementioned components, which may be coupled to one another via a wired or wireless local area network (LAN). Remote control facility 160 may receive and transmit data via one or more appropriate devices and network from and to the autonomous vehicle 110, such as by wireless systems, such as 882.11x, GPRS, and the like. A database at the remote control facility 160 can store account information such as subscriber authentication information, vehicle identifiers, profile records, behavioral patterns, and other pertinent subscriber information. The remote control facility 160 may also include a database of roads, routes, locations, etc. permitted for use by autonomous vehicle 110. The remote control facility 160 may communicate with the autonomous vehicle 110 to provide route guidance in response to a request received from the vehicle.

For example, based upon information stored in a mapping system of the remote control facility 160, the remote control facility may determine the conditions of various roads or portions thereof. Autonomous vehicles, such as the autonomous vehicle 110, may, in the course of determining a navigation route, receive instructions from the remote control facility 160 regarding which roads or portions thereof, if any, are appropriate for use under certain circumstances, as described hereinbelow. Such instructions may be based in part on information received from the autonomous vehicle 110 or other autonomous vehicles regarding road conditions Accordingly, remote control facility 160 may receive information regarding the roads/routes generally in real-time from one or more vehicles.

The system 100 functions to enable an autonomous vehicle 110 to modify and/or set a driving behavior in response to parameters set by vehicle passengers (e.g., via the passenger interface 120) and/or other interested parties (e.g., via the vehicle coordinator 130 or remote expert interface 140). In accordance with features of embodiments described herein, the system 100 further functions to enable autonomous vehicle 110 to modify and/or set a driving behavior and/or route automatically in response to delivery contents or other considerations or factors. Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

The autonomous vehicle 110 preferably includes a throttle interface that controls an engine throttle, motor speed (e.g., rotational speed of electric motor), or any other movement-enabling mechanism; a brake interface that controls brakes of the autonomous vehicle (or any other movement-retarding mechanism); and a steering interface that controls steering of the autonomous vehicle (e.g., by changing the angle of wheels of the autonomous vehicle). The autonomous vehicle 110 may additionally or alternatively include interfaces for control of any other vehicle functions; e.g., windshield wipers, headlights, turn indicators, air conditioning, etc.

In addition, the autonomous vehicle 110 preferably includes an onboard computer 145 and a sensor suite 150 (e.g., computer vision ("CV") system, LIDAR, RADAR, wheel speed sensors, GPS, cameras, etc.). The onboard computer 145 functions to control the autonomous vehicle 110 and processes sensed data from the sensor suite 150 and/or other sensors in order to determine the state of the autonomous vehicle 110. Based upon the vehicle state and programmed instructions, the onboard computer 145 preferably modifies or controls driving behavior of the autonomous vehicle 110.

Driving behavior may include any information relating to how an autonomous vehicle drives (e.g., actuates brakes, accelerator, steering) given a set of instructions (e.g., a route or plan). Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes).

The onboard computer 145 functions to control the operations and functionality of the autonomous vehicles 110 and processes sensed data from the sensor suite 150 and/or other sensors in order to determine states of the autonomous vehicles no. Based upon the vehicle state and programmed instructions, the onboard computer 145 preferably modifies or controls behavior of autonomous vehicles 110. The onboard computer 145 is preferably a general-purpose computer adapted for I/O communication with vehicle control systems and sensor systems, but may additionally or alternatively be any suitable computing device. The onboard computer 145 is preferably connected to the Internet via a wireless connection (e.g., via a cellular data connection). Additionally or alternatively, the onboard computer 145 may be coupled to any number of wireless or wired communication systems.

The sensor suite 150 preferably includes localization and driving sensors; e.g., photodetectors, cameras, RADAR, SONAR, LIDAR, GPS, inertial measurement units (IMUS), accelerometers, microphones, strain gauges, pressure monitors, barometers, thermometers, altimeters, etc.

Figure 2:
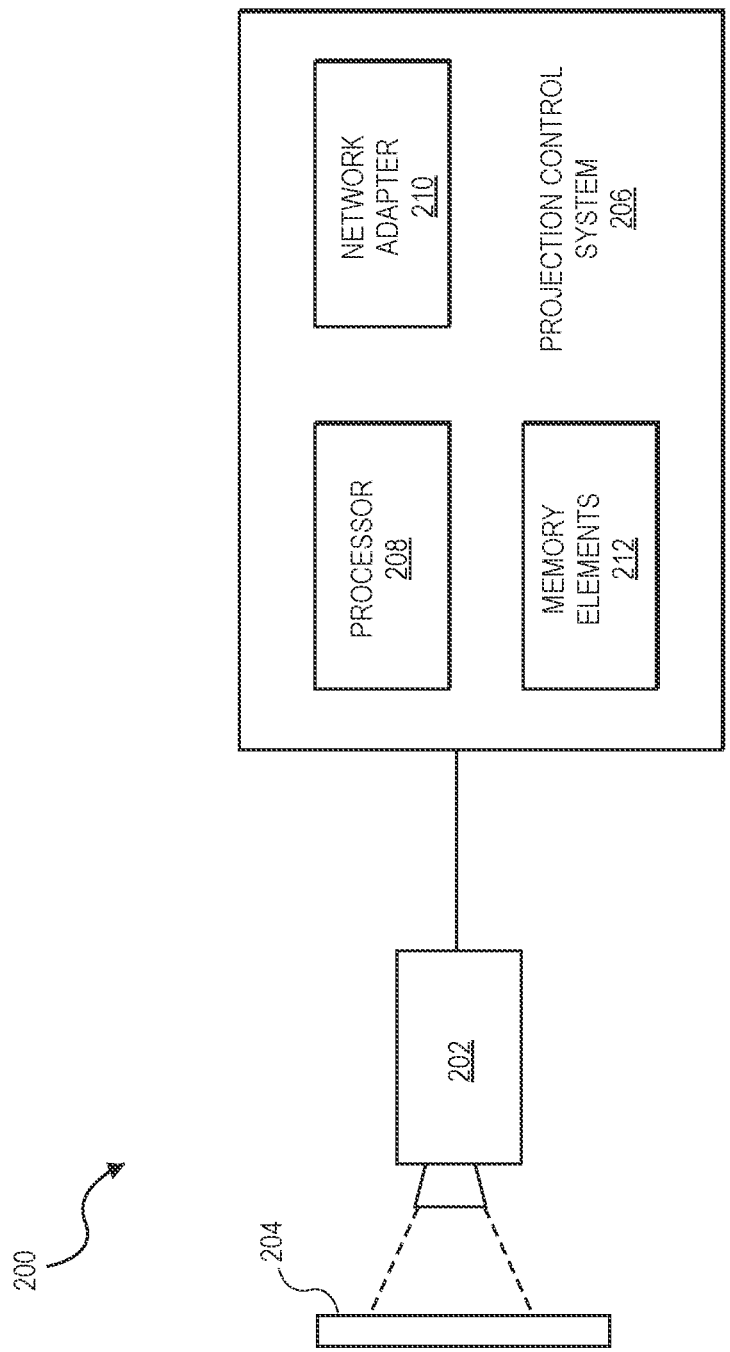
FIG. 2 is a block diagram illustrating a portion of an example augmented reality notification for an autonomous vehicle according to some embodiments of the present disclosure.

FIG. 2 is a block diagram of at least a portion of an augmented reality information system, designated in FIG. 2 by a reference numeral 200, which may be implemented in an autonomous vehicle, such as the autonomous vehicle 110. As shown in FIG. 2, the system 200 includes one or more display systems, represented in FIG. 2 by a display system 202, and one or more windows, represented in FIG. 2 by a window 204. In accordance with features of one embodiment, the window 204 functions as a projector screen and the display system 202 comprises a projector such that images projected thereon are visible to users inside and/or outside the vehicle. For example, in one embodiment, the window 204 has been treated (e.g., by applying a projection film on an inside or outside surface thereof) such that it may function as a projector screen for displaying images. In one embodiment, a projector comprising display system 202 is positioned inside a vehicle at a location relative to a window 204 such that light emitted by the projector produces an image on the window. In particular, the projector may be positioned such that the window corresponds to a focal plane of the projector. The projector may be attached to any surface within the vehicle (e.g., the ceiling/roof or a door, for example) and using any appropriate more or less permanent attachment mechanism (e.g., a screw, a bolt, or Velcro, for example) directly or via an extension mechanism. In certain embodiments, multiple projectors are provided, each directed toward and corresponding to a specific window. In an alternative embodiment, a single projector may be provided, in which embodiment the position of the projector may be adjusted (e.g., swiveled) such that the single projector may be used to project images onto multiple ones of the windows.

In a alternative embodiment, the display system 202 may be electrically connected and/or integrated into the window 204, which is configured such that images are displayed on the window by generating images within the material comprising the window 204. For example, data comprising an image to be displayed on the window 204 may be provided by the display system 202 via a data cable, such as, but not limited to, an HDMI cable.

As further illustrated in FIG. 2, the system 200 further includes a control system 206 for controlling operation of the display system 202. Although illustrated in FIG. 2 as an independent system, it will be recognized that the control system 206 may be incorporated and/or integrated into the display system 202. The control system 206 may include a processor 208, memory elements 210, and a network adapter 212. The processor 208 may be a hardware processor and may be coupled to memory elements 210 via a system bus (not shown). Program code and/or data, as well as images to be displayed on the window 204 by the display system 202, may be stored within memory elements 210. The processor 208 may execute the program code accessed from the memory elements 210 via a system bus. It should be appreciated, however, that the system 200 may be implemented in the form of any system including a processor and a memory that is capable of performing the functions described in this disclosure.

In some embodiments, the processor 208 can execute software or an algorithm to perform the activities as discussed in this specification and may include any combination of hardware, software, or firmware providing programmable logic, including by way of non-limiting example a microprocessor, a DSP, a field-programmable gate array (FPGA), a programmable logic array (PLA), an integrated circuit (IC), an application specific IC (ASIC), or a virtual machine processor. The processor 208 may be communicatively coupled to the memory elements 210, for example in a direct-memory access (DMA) configuration, so that the processor may read from or write to the memory elements.

In general, the memory elements 210 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the system 200 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures may also include suitable interfaces for receiving, transmitting, and/or otherwise communicating data or information in a network environment so that they can communicate with, for example, a system having hardware similar or identical to another one of these elements.

The network adapter 212 enables the system 200 to be coupled to other systems, computer systems, remote network devices, and/or remote storage devices through intervening private or public networks. The network adapter may comprise a data receiver for receiving data that is transmitted by said systems, devices and/or networks to the system 200, and a data transmitter for transmitting data from the system 200 to said systems, devices and/or networks. Modems, cable modems, and Ethernet cards are examples of different types of network adapter that may be used with the system 200. In certain embodiments, the control system 200 may be connected to a remote system (e.g., remote control facility 160 (FIG. 1)) via the network adapter 212 for receiving instructions regarding images to be displayed on the window 204 using the display system 202. For example, the control system 206 may receive from the remote system one or more images to be displayed on the window 204. Alternatively, the control system 206 may receive from the remote systems instructions for selecting one or more images (e.g., from memory and/or bulk storage 210) to be displayed on the window 204. As will be described in greater detail below, the image(s) selected for display may comprise text, graphical elements, or a combination of the two and may be selected based on a current and/or future state of the vehicle and/or an intent of the vehicle. In certain embodiments, the perceived environment and/or graphical location of the vehicle may also be considered in selecting an image for display.

It will be recognized that, in some embodiments, multiple display systems may be provided in the vehicle, with the same or different images being projected onto, or displayed on, different windows.

Figure 3:
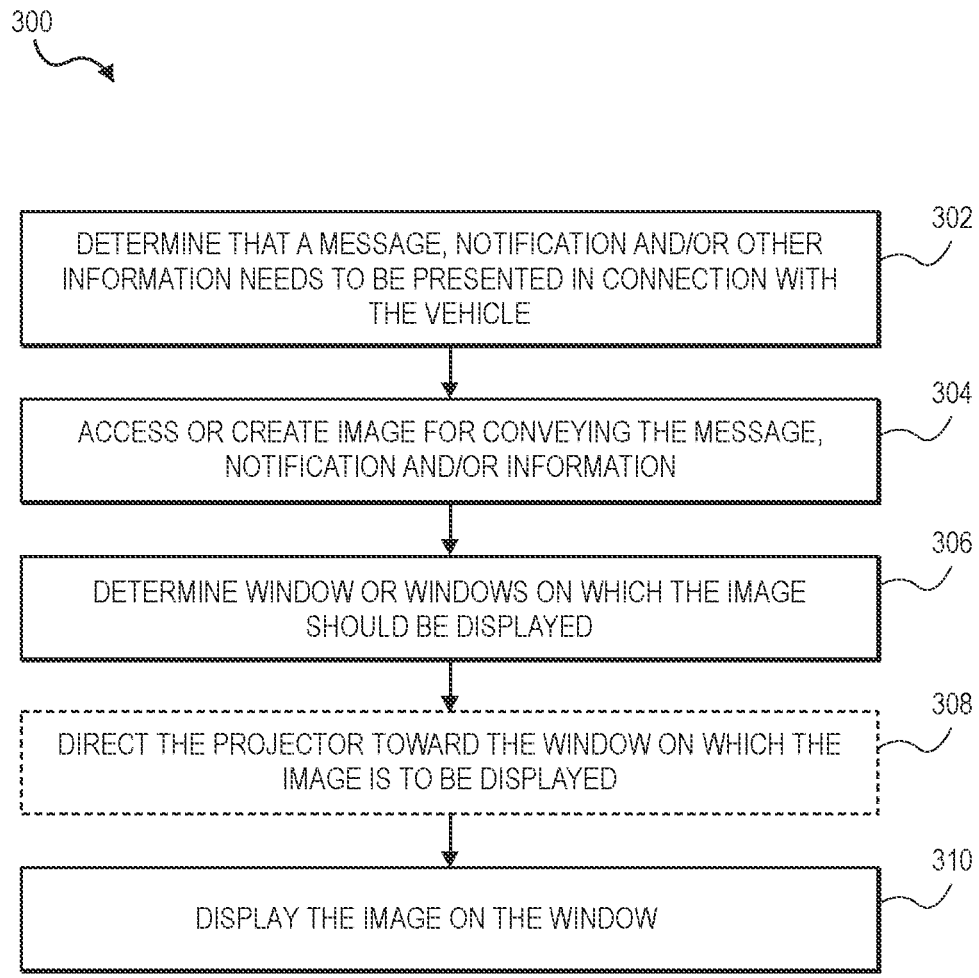
FIG. 3 is a flowchart of an example method implemented by an example augmented reality notification system for an autonomous vehicle according to some embodiments of the present disclosure.

FIG. 3 is a flowchart of an example method 300 implemented by an augmented reality notification system for autonomous vehicles in accordance with embodiments described herein, such as the system 200. It will be recognized that portions or all of one or more of the steps of the example method 300 may be implemented locally (i.e., within the vehicle itself), while portions or all of others may be implemented remotely (e.g., at a central office and/or remote control facility). In step 302, a determination is made that a message, notification, and/or other information needs to be presented in connection with the vehicle. The determination may be made, for example, by a vehicle control system that tracks and/or controls an operation of the vehicle and has access to mapping and relevant route data and therefore is aware of a current (e.g., en route to make a delivery) and/or a future state or intent (e.g., getting ready to pick up a passenger) of the vehicle. In some embodiments, the perceived environment of the vehicle (e.g., detection of a person crossing in front of the vehicle) and/or a geographic location of the vehicle (e.g., in a city setting) may be considered in making the determination that an image should be displayed. In step 304, an image for conveying the message, notification, and/or other information determined in step 302 is generated (e.g., accessed or created). In some embodiments, the image comprises one or both of text and graphical elements and may be stored either locally to the vehicle or provided from a remote system. The image may also be "assembled" from multiple images or image elements based on the determination made in step 302. In step 306, a determination is made on which window or windows the image should be displayed. In optional step 308, in embodiments in which the display system includes a single projector for projecting images c multiple windows, the projector is positioned such that it may project the image onto the window determined in step 306. In step 310, the image is displayed on a window of the vehicle. In embodiments including multiple display systems, the image may be presented by the display system corresponding to the window determined in step 306. In embodiments with a single display system (e.g., as single projector), the image may be displayed by the single display system (e.g., the single projector) on the window determined in step 306.

Figure 4A:
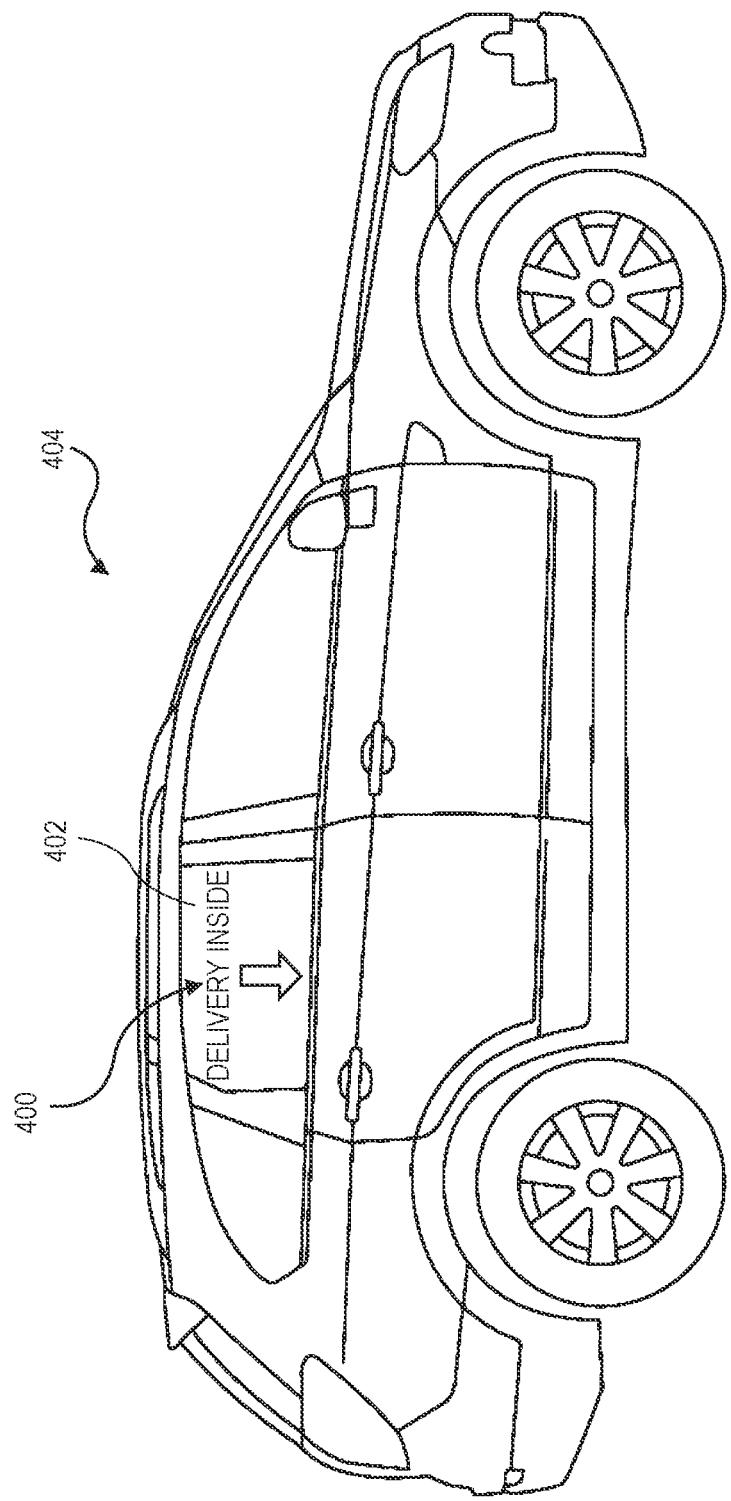

FIGS. 4A-4F each provide a visual illustration of example use cases including images for display on a window of a vehicle, such as the autonomous vehicle 110, in connection with the augmented reality information system. Referring first to FIG. 4A, illustrated therein is a use case in which an image 400 is displayed on one or more side windows, represented in FIG. 4A by a rear passenger side window 402, of an autonomous vehicle 404. The image 400 includes both text and graphics to convey information to a user outside the vehicle; in particular, the image informs the user where the delivery is located (and thereby conveys to the user which door to open). FIG. 4B illustrates a different example of the use case shown in FIG. 4A. In FIG. 4B, an image 410 is displayed on one or more side windows, represented in FIG. 4B by a rear passenger side window 412, of an autonomous vehicle 414. Similar to the image 400 (FIG. 4A), the image 410 is a text image used to convey information to a user outside the vehicle 414; in particular, the image informs the user (presumably a potential passenger) what door to use to enter the vehicle. It will be noted that in a similar use case, a message may be displayed on one of the side windows (e.g., window 410) such that it is viewable by a passenger inside the vehicle 414 advising the passenger of which door to use to exit the vehicle, for example. In a similar fashion, an arrow pointing in a direction the passenger should proceed upon exiting the vehicle 414, for example, may also be displayed on one of the side windows (e.g., side window 410). It will be noted that in the use case illustrated in FIGS. 4A, for example, information from sensors and cameras disposed within the vehicle may be used to determine where in the vehicle the package is located, for example, and cause the image 400 to be displayed on the appropriate side window. Similarly, in the use case illustrated in FIG. 4B, sensor data and routing information may be used to determine which door the passenger should use to enter (or exit) the vehicle, for example, and cause the image 410 to be displayed on the appropriate side window.

Figure 4C:
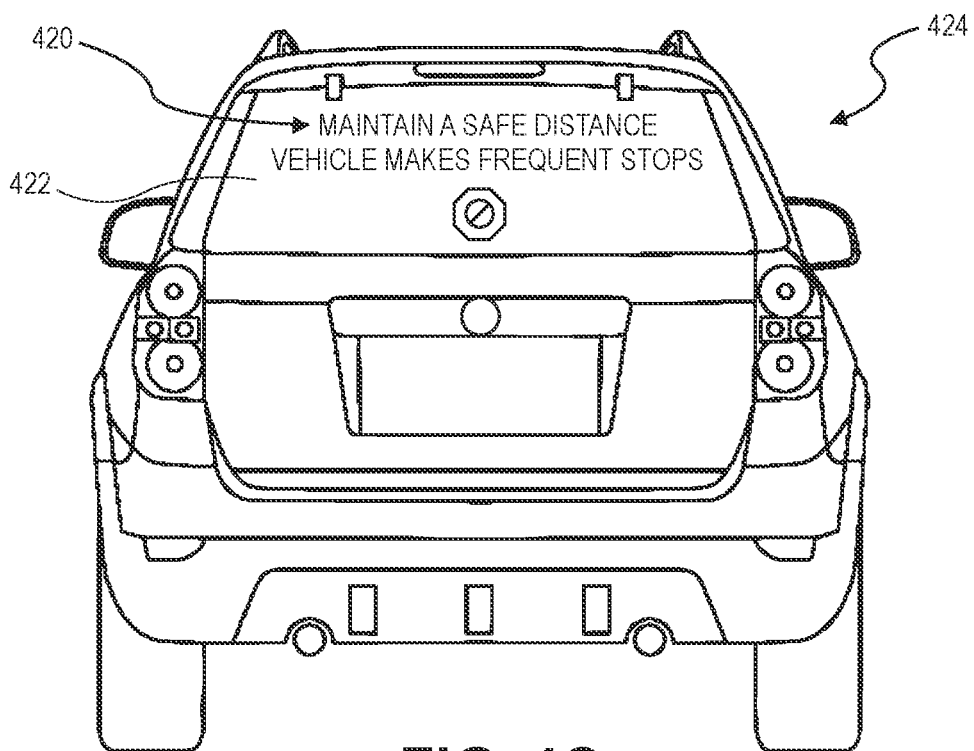
Figure 4D:
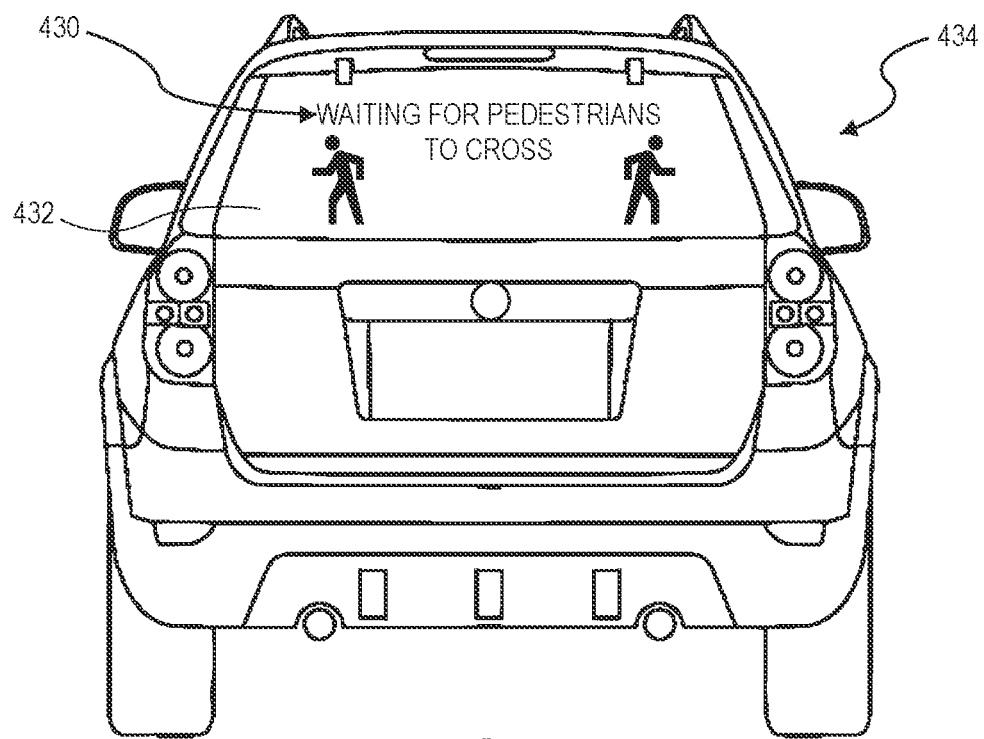

Referring now to FIG. 4C, illustrated therein is a use case in which an image 420 is displayed on the rear window 422 of an autonomous vehicle 424. The image 420 includes both text and graphics for conveying information to a driver of a vehicle being driven behind the vehicle 424; in particular, the image advises the driver to maintain a safe distance due when the vehicle 424 is being deployed as a delivery vehicle. FIG. 4D illustrates a different example of the use case shown in FIG. 4C. In FIG. 4D, an image 430 is displayed on the rear window 432 of an autonomous vehicle 444. Similar to the image 420, the image 430 includes both text and graphics for conveying information to a driver of a vehicle being driven behind the vehicle 434; in particular, the image advises the driver of the current state and intent of the vehicle. In the illustrated embodiment, the image 430 informs a driver (or other person) situated behind the vehicle 444 that the vehicle is waiting for pedestrians to cross the street. It will be noted that in the use case illustrated in FIG. 4C, knowledge about the vehicle's current state (e.g., actively making a delivery) is used to determine the contents of the image to display on the window 422. Similarly, in the use case illustrated in FIG. 4D, knowledge about the intent of the vehicle (based on current state, route, and bulk information, for example) is used to determine the content of the image to display on the window 432. Particularly in the case of the use case illustrated in FIG. 4D, the image displayed on the window 432 may change dynamically as the intent of the vehicle 434 changes. Another example of an image such as the image 444 may convey a message based on knowledge of the state and/or intent of the vehicle, such as "Slowing Down for Double Parked Car."

Figure 4E:
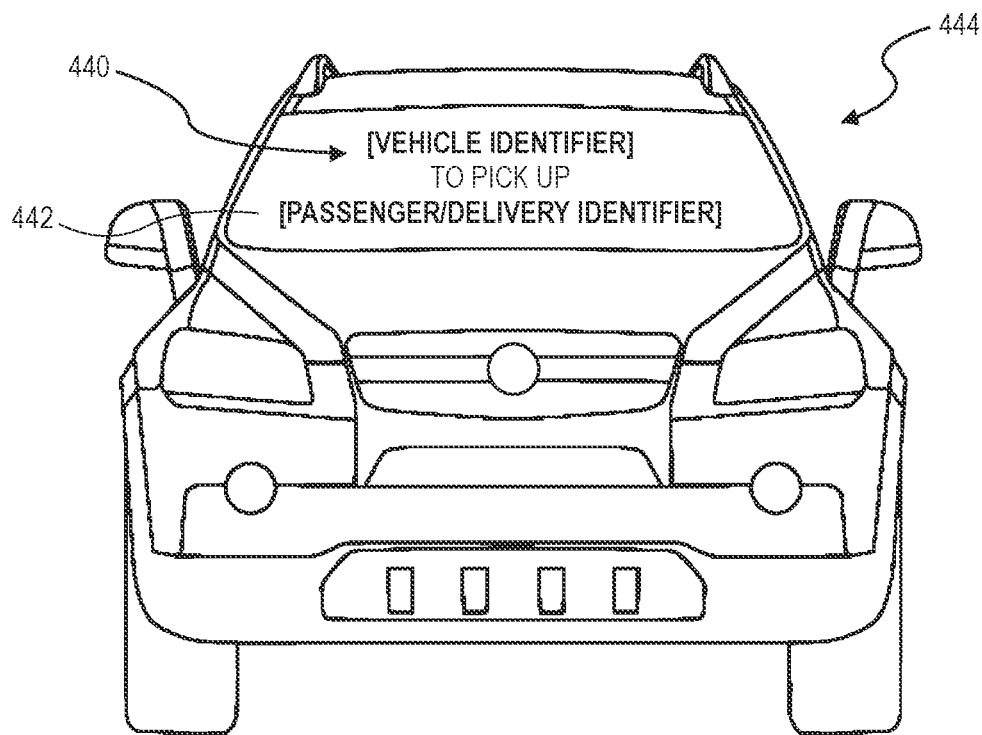
Figure 4F:
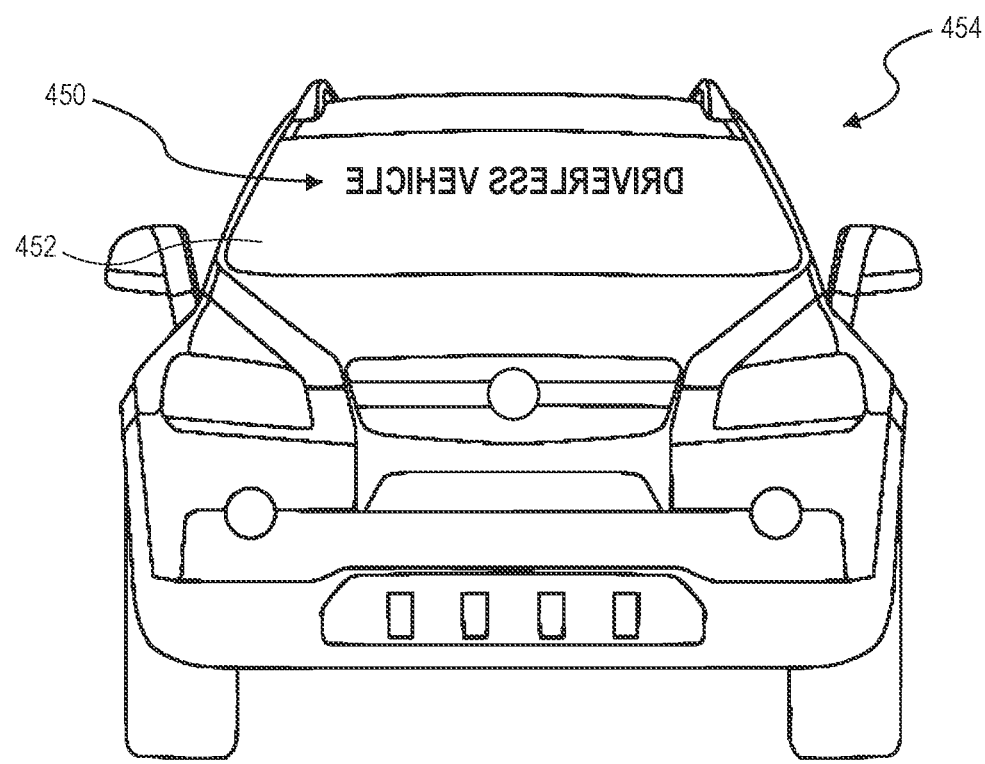

Referring first to FIG. 4E, illustrated therein is a use case in which an image 440 is displayed on the front windshield 442 of an autonomous vehicle 444. The image 440 is a text message used to convey information to a user outside the vehicle; in particular, the image conveys information to the user regarding the identity of the vehicle and the identity of the passenger and/or item to be picked up, all of which information may be available from an onboard and/or remote vehicle control system. FIG. 4F illustrates a different example of the use case shown in FIG. 4E. In FIG. 4F, an image 450 is displayed on the front windshield 452 of an autonomous vehicle 454. The image 450 is a text image and is displayed such that it will be readable in a rearview mirror of a driver of a vehicle in front of the vehicle 454. The image 450 may be displayed at any time during operation of the vehicle 454 but may be especially useful in high traffic areas or situations, as determined by an onboard or remote vehicle control system.

Figure 5:
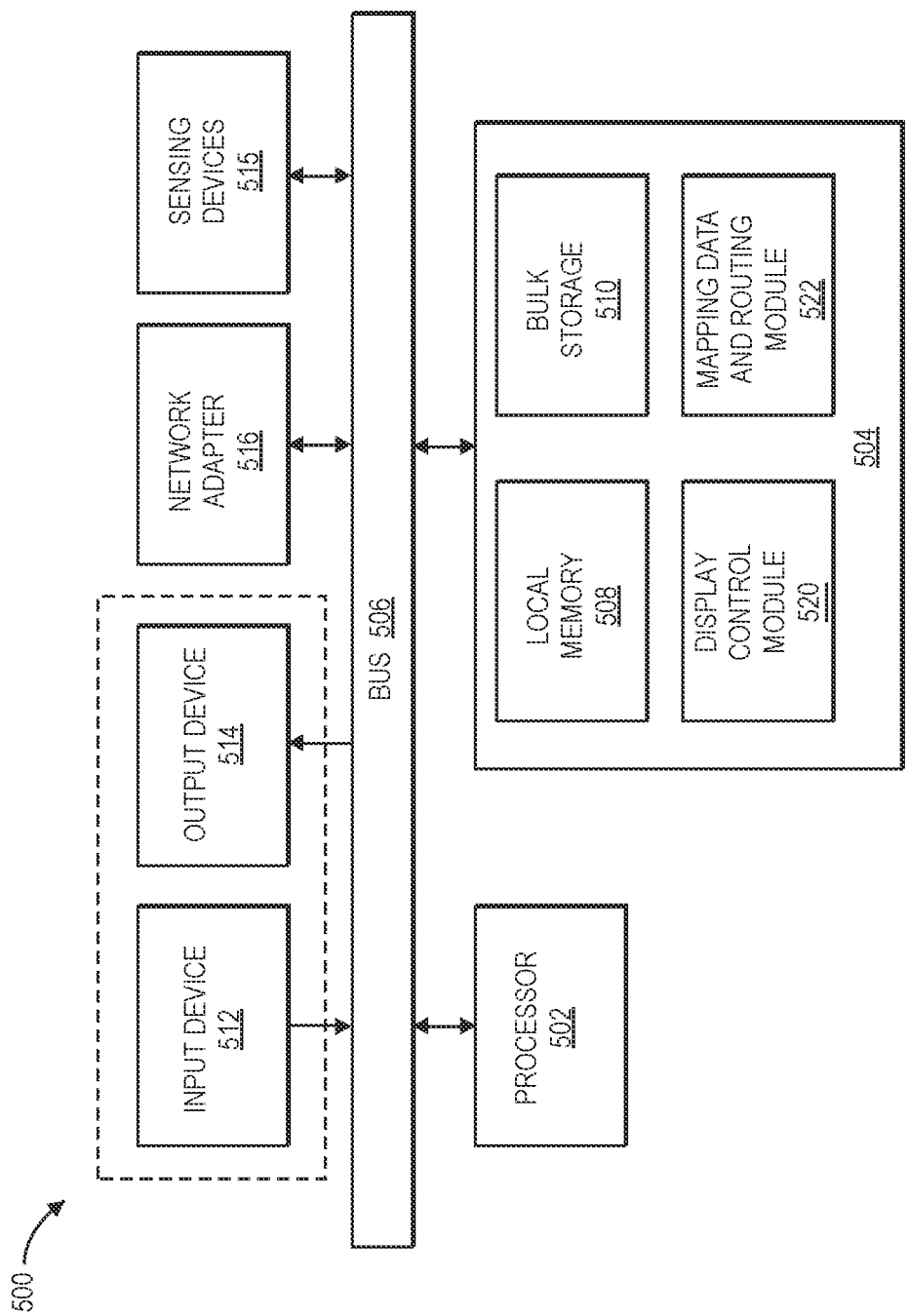
FIG. 5 is a block diagram of a computer system that may be deployed in implementing an augmented reality notification for an autonomous vehicle according to some embodiments of the present disclosure.

FIG. 5 is a block diagram illustrating an example system 500 that may be configured to implement at least portions of an augmented reality information system for an autonomous vehicle, such as the autonomous vehicle 110, in accordance with embodiments described herein, and more particularly as shown in the FIGURES described hereinabove. Part or all of the intelligent delivery system 500 may be implemented as a sensor suite, such as the sensor suite 150, and/or an onboard vehicle control system, such as onboard computer 145, and/or a remote vehicle control system, such as remote control facility 160. As shown in FIG. 5, the intelligent delivery system 500 may include at least one processor 502, e.g. a hardware processor 502, coupled to memory elements 504 through a system bus 506. As such, the system may store program code and/or data within memory elements 504. Further, the processor 502 may execute the program code accessed from the memory elements 504 via a system bus 506. In one aspect, the system may be implemented as a computer that is suitable for storing and/or executing program code (e.g., onboard computer 145). It should be appreciated, however, that the system 500 may be implemented in the form of any system including a processor and a memory that is capable of performing the functions described in this disclosure.

In some embodiments, the processor 502 can execute software or an algorithm to perform the activities as discussed in this specification; in particular, activities related to an intelligent delivery system for an autonomous vehicle in accordance with embodiments described herein. The processor 502 may include any combination of hardware, software, or firmware providing programmable logic, including by way of non-limiting example a microprocessor, a DSP, a field-programmable gate array (FPGA), a programmable logic array (PLA), an integrated circuit (IC), an application specific IC (ASIC), or a virtual machine processor. The processor 502 may be communicatively coupled to the memory element 504, for example in a direct-memory access (DMA) configuration, so that the processor 502 may read from or write to the memory elements 504.

In general, the memory elements 504 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the system 500 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures may also include suitable interfaces for receiving, transmitting, and/or otherwise communicating data or information in a network environment so that they can communicate with, for example, a system having hardware similar or identical to another one of these elements.

In certain example implementations, mechanisms for implementing an intelligent delivery system for an autonomous vehicle as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 504 shown in FIG. 5, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 502 shown in FIG. 5, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 504 may include one or more physical memory devices such as, for example, local memory 508 and one or more bulk storage devices 510. The local memory may refer to RAM or other non-persistent memory device(s) generally used during actual execution of the program code. A bulk storage device may be implemented as a hard drive or other persistent data storage device. The processing system 500 may also include one or more cache memories (not shown) that provide temporary storage of at least some program code in order to reduce the number of times program code must be retrieved from the bulk storage device 510 during execution.

As shown in FIG. 5, the memory elements 504 may store a display control module 520 and a mapping data and route module 522. In various embodiments, the modules 520, 522, may be stored in the local memory 508, the one or more bulk storage devices 510, or apart from the local memory and the bulk storage devices. It should be appreciated that the system 500 may further execute an operating system (not shown in FIG. 5) that can facilitate execution of the modules 520, 522. The modules 520, 522, being implemented in the form of executable program code and/or data, can be read from, written to, and/or executed by the system 500, e.g., by the processor 502. Responsive to reading from, writing to, and/or executing the modules 520, 522, the system 500 may be configured to perform one or more operations or method steps described herein.

Input/output (I/O) devices depicted as an input device 512 and an output device 514, optionally, may be coupled to the system. Examples of input devices may include, but are not limited to, a keyboard, a pointing device such as a mouse, or the like. Examples of output devices may include, but are not limited to, a monitor or a display, speakers, or the like. In some implementations, the system may include a device driver (not shown) for the output device 514. Input and/or output devices 512, 514 may be coupled to the system 500 either directly or through intervening I/O controllers. Additionally, sensing devices 515, may be coupled to the system 500. Examples of sensing devices 515 may include, but are not limited to, cameras (located inside and/or outside the vehicle), LIDARs, RADARS, scales, QR code readers, bar code readers, RF sensors, and others. Sensing devices 515 may be coupled to the system 500 either directly or through intervening controllers and/or drivers.

Cameras may be implemented using high-resolution imagers with fixed mounting and field of view. LIDARs may be implemented using scanning LIDARs with dynamically configurable field of view that provides a point-cloud of the region intended to scan. RADARs may be implemented using scanning RADARs with dynamically configurable field of view.

In an embodiment, the input and the output devices may be implemented as a combined input/output device (illustrated in FIG. 5 with a dashed line surrounding the input device 512 and the output device 514). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 516 may also, optionally, be coupled to the system 500 to enable it to become coupled to other systems, computer systems, remote network devices, and/or remote storage devices through intervening private or public networks. The network adapter may comprise a data receiver for receiving data that is transmitted by said systems, devices and/or networks to the system 500, and a data transmitter for transmitting data from the system 500 to said systems, devices and/or networks. Modems, cable modems, and Ethernet cards are examples of different types of network adapter that may be used with the system 500.

Example 1 is a method including detecting an event in connection with an autonomous vehicle, wherein the detected event comprises at least one of a current state of the autonomous vehicle, an impending state of the autonomous vehicle, and an intent of the autonomous vehicle; generating an image in connection with the detected event, wherein the image comprises at least one of text information and graphics information; and displaying the generated image on at least one window of the autonomous vehicle for conveying information about the detected event to at least one user located outside the autonomous vehicle.

In Example 2, the method of Example 1 may further include the at least one window including a plurality of windows and the method may further comprise selecting, based on the detected event, at least one of the plurality of windows on which to display the generated image.

In Example 3, the method of any of Examples 1-2 may further include the selecting, based on the detected event, at least one of the plurality of windows comprising selecting multiple ones of the plurality of windows on which to display the generated image.

In Example 4, the method of any of Examples 1-3 may further include the generating an image comprising generating multiple images and wherein the displaying the generated image on at least one window comprises displaying each of the generated multiple images on different ones of the plurality of windows.

In Example 5, the method of any of Examples 1-4 may further include the displaying being performed by a projector.

In Example 6, the method of any of Examples 1-5 may further include the projector being fixedly mounted such that it projects images only on the at least one window.

In Example 7, the method of any of Examples 1-6 may further include the projector being moveably mounted such that it can project images onto a window of the autonomous vehicle other than the at least one window.

In Example 8, the method of any of Examples 1-7 may further include the at least one window comprising a side window of the autonomous vehicle and the image comprises information directed to an intended user of the autonomous vehicle.

In Example 9, the method of any of Examples 1-8 may further include the at least one window comprising a rear window of the autonomous vehicle and the image comprises information directed to a driver of a vehicle driving behind the autonomous vehicle.

In Example 10, the method of any of Examples 1-9 may further include the at least one window comprising a front windshield of the autonomous vehicle and the image being displayed on the front windshield of the autonomous vehicle such that it is readable in the rear view mirror of a car driving directly in front of the autonomous vehicle.

Example 11 is an augmented reality notification system for a vehicle comprising display control system for detecting an event in connection with the vehicle, the detected event comprising at least one of a current state of the autonomous vehicle, an impending state of the autonomous vehicle, and an intent of the autonomous vehicle, and generating an image in connection with the detected event, wherein the image comprises at least one of text information and graphics information; and a display system for displaying the generated image on at least one window of the autonomous vehicle for conveying information about the detected event to at least one user located outside the autonomous vehicle.

In Example 12, the system of Example 11 may further include the at least one window comprising a plurality of windows and the display control system may further select, based on the detected event, at least one of the plurality of windows on which to display the generated image.

In Example 13, the system of any of Examples 11-12 may further include the selecting, based on the detected event, at least one of the plurality of windows comprising selecting multiple ones of the plurality of windows on which to display the generated image.

In Example 14, the system of any of Examples 11-13 may further include the generating an image comprising generating multiple images and wherein the displaying the generated image on at least one window comprises displaying each of the generated multiple images on different ones of the plurality of windows.

In Example 15, the system of any of Examples 11-14 may further include a projector being fixedly mounted such that it displays images only on the at least one window.

In Example 16, the system of any of Examples 11-15 may further include the projector being moveably mounted such that it can project images onto a window of the autonomous vehicle other than the at least one window.

Example 17 is a vehicle comprising an onboard computer; a sensor suite comprising a plurality of imaging devices and at least one sensing device for generating data regarding a perceived environment of the vehicle; a display control system for detecting an event in connection with the vehicle, the detected event comprising at least one of a current state of the autonomous vehicle, an impending state of the autonomous vehicle, and an intent of the autonomous vehicle, and generating an image in connection with the detected event and the perceived environment, wherein the image comprises at least one of text information and graphics information; and a display system for displaying projecting the generated image on at least one window of the autonomous vehicle for conveying information about the detected event to at least one user located outside the autonomous vehicle.

In Example 18, the vehicle of Example 17 may further include the at least one window comprising a plurality of windows and the display control system may further select, based on the detected event and the perceived environment, at least one of the plurality of windows on which to display the generated image.

In Example 19, the vehicle of any of Examples 17-18 may further include the selecting, based on the detected event and the perceived environment, at least one of the plurality of windows comprising selecting multiple ones of the plurality of windows on which to display the generated image.

In Example 20, the vehicle of any of Examples 17-19 may further include the generating an image comprising generating multiple images and wherein the displaying the generated image on at least one window comprises displaying each of the generated multiple images on different ones of the plurality of windows.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGS. and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to contactless current measurement using magnetic sensors, e.g. those summarized in the one or more processes shown in FIGS., illustrate only some of the possible functions that may be executed by, or within, the current measurement systems illustrated in the FIGS. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method comprising:
   detecting first and second events in connection with a first vehicle;
   generating a first image in connection with the first event and a second image different than the first image in connection with the second event, wherein the first and second images comprise information about the detected first and second events, respectively; and
   displaying the generated first and second images on first and second surfaces of the first vehicle, wherein at least one of the first and second surfaces comprises a window of the first vehicle;
   wherein the first image is displayed on the first surface to communicate information about the first detected event to at least one user located inside the first vehicle and the second image is displayed on the second surface to communicate information about the detected second event to at least one user located outside the first vehicle; and
   wherein the first surface comprises a side window of the first vehicle and the first image comprises information directed to a passenger of the first vehicle regarding at least one of an indication of an exit to be used by the passenger to exit the first vehicle and an indication of a direction to proceed once the passenger has exited the first vehicle.

2. The method of claim 1, wherein the at least one user located outside the first vehicle is located inside a second vehicle.

3. The method of claim 1, wherein the first and second surfaces comprise different windows of the first vehicle.

4. The method of claim 1, wherein at least one of the first and second surfaces comprises a glass surface other than a window of the first vehicle.

5. The method of claim 1, further comprising:
   selecting from a plurality of surfaces of the first vehicle the first surface based on the detected first event; and
   selecting from the plurality of surfaces of the first vehicle the second surface based on the detected second event.

6. The method of claim 1, wherein the first and second images are non-video images.

7. The method of claim 1, wherein the displaying is performed by a first projector mounted inside the first vehicle and a second projector mounted on an outside surface of the first vehicle.

8. The method of claim 7, wherein at least one of the projectors is moveably mounted such that it can project images on to various surfaces of the first vehicle including at least one of the first and second surfaces.

9. The method of claim 1, wherein the second surface comprises a rear window of the first vehicle and the image comprises information directed to a driver of a second vehicle, wherein the second vehicle is located-behind the first vehicle.

10. The method of claim 1, wherein the second surface comprises a front windshield of the first vehicle and wherein the second image is displayed on the front windshield of the first vehicle such that it is readable in the rear view mirror of a driver of a second vehicle, wherein the second vehicle is located directly in front of the first vehicle.

11. One or more non-transitory computer-readable storage media comprising instructions for execution which, when executed by a processor, result in operations comprising:
    detecting first and second events in connection with a first vehicle;
    generating a first image in connection with the first event and a second image different than the first image in connection with the second event, wherein the first and second images comprise information about the detected first and second events, respectively; and
    displaying the generated first and second images on selected first and second surfaces of the first vehicle;
    wherein the first image is displayed on the first surface to communicate information about the first detected event to at least one user located inside the first vehicle and the second image is displayed on the second surface to communicate information about the detected second event to at least one user located outside the first vehicle; and
    wherein the first surface comprises a side window of the first vehicle and the first image comprises information directed to a passenger of the first vehicle regarding at least one of an indication of an exit to be used by the passenger to exit the first vehicle and an indication of a direction to proceed once the passenger has exited the first vehicle.

12. The one or more non-transitory computer-readable storage media of claim 11, wherein the operations further comprise:
    selecting from a plurality of surfaces of the first vehicle the first surface based on the detected first event; and
    selecting from a plurality of surfaces of the first vehicle the second surface based on the detected second event.

13. A vehicle comprising:
    an onboard computer;
    a sensor suite comprising a plurality of imaging devices and at least one sensing device for generating data regarding a perceived environment of the vehicle;
    a display control system configured to:
        detect first and second events in connection with the vehicle;
        generate a first image in connection with the first event and a second image different than the first image in connection with the second event, wherein the first and second images comprise information about the detected first and second events, respectively; and
        display the generated first and second images on selected first and second surfaces of the vehicle, wherein at least one of the first and second surfaces comprises a window of the vehicle;
    wherein the first image is displayed on the first surface to communicate information about the first detected event to at least one user located inside the vehicle and the second image is displayed on the second surface to communicate information about the detected second event to at least one user located outside the vehicle; and
    wherein the first surface comprises a side window of the first vehicle and the first image comprises information directed to a passenger of the first vehicle regarding at least one of an indication of an exit to be used by the passenger to exit the first vehicle and an indication of a direction to proceed once the passenger has exited the first vehicle.

14. The vehicle of claim 13, wherein the vehicle comprises a first vehicle and wherein the at least one user located outside the first vehicle is located inside a second vehicle.

15. The vehicle of claim 13, wherein the first and second surfaces comprise different windows of the vehicle.

16. The vehicle of claim 13, wherein at least one of the first and second surfaces comprises a glass surface other than a window of the vehicle.

17. The vehicle of claim 13, wherein the display control system is further configured to:
    select from a plurality of surfaces of the vehicle the first surface based on the detected first event; and
    select from the plurality of surfaces of the vehicle the second surface based on the detected second event.

18. The vehicle of claim 13, further comprising a first projector mounted inside the vehicle and a second projector mounted on an outside surface of the vehicle.

19. The vehicle of claim 18, wherein at least one of the projectors is moveably mounted such that it can project images on to various surfaces of the vehicle including at least one of the first and second surfaces.

* * * * *